United States Patent [19]

Ohta et al.

[11] Patent Number: 4,510,543
[45] Date of Patent: Apr. 9, 1985

[54] MAGNETIC HEAD SYSTEM FOR TAPE PLAYER

[75] Inventors: Hiroyuki Ohta; Yutaka Masumoto, both of Tokorozawa, Japan

[73] Assignee: Pioneer Electronic Corporation, Tokyo, Japan

[21] Appl. No.: 315,519

[22] Filed: Oct. 27, 1981

[30] Foreign Application Priority Data

| Oct. 31, 1980 | [JP] | Japan | 55-154820[U] |
| Dec. 3, 1980 | [JP] | Japan | 55-172672[U] |
| Dec. 3, 1980 | [JP] | Japan | 55-172674[U] |
| Dec. 9, 1980 | [JP] | Japan | 55-175554[U] |
| Dec. 29, 1980 | [JP] | Japan | 55-187930[U] |
| Jan. 16, 1981 | [JP] | Japan | 56-004288[U] |

[51] Int. Cl.³ ............................................. G11B 5/55
[52] U.S. Cl. ..................................................... 360/106
[58] Field of Search ............... 360/106, 104, 109, 129

[56] References Cited

U.S. PATENT DOCUMENTS

| 3,376,396 | 4/1968 | Bradt et al. | 360/106 |
| 3,614,342 | 10/1971 | Siebert | 360/106 |
| 3,692,314 | 9/1972 | Dattilo | 360/109 |
| 3,855,628 | 12/1974 | Bachmann | 360/106 |
| 4,302,788 | 11/1981 | Yamamoto | 360/106 |

FOREIGN PATENT DOCUMENTS 821137  8/1969  Canada ................................ 360/109

Primary Examiner—George G. Stellar

[57] ABSTRACT

A magnetic head system for a tape player capable of changing tracks in association of the magnetic tape by rotating the magnetic head. The magnetic head is enclosed in a rotary member. As the rotary member rotates 180 degrees about its axis, the housing which accommodates the rotary member controls the rotation of the rotary member for optimum azimuth angle adjustment.

6 Claims, 37 Drawing Figures

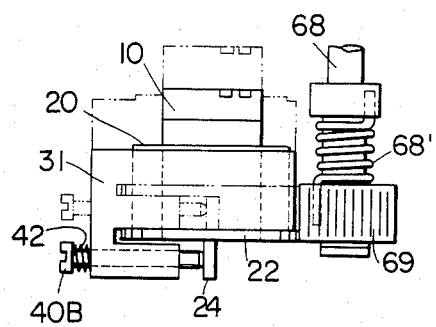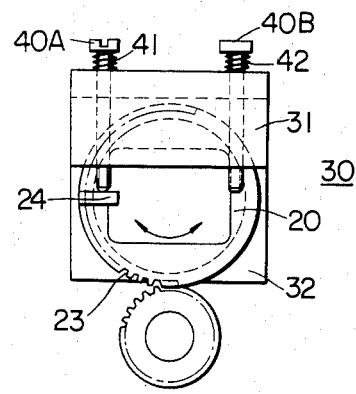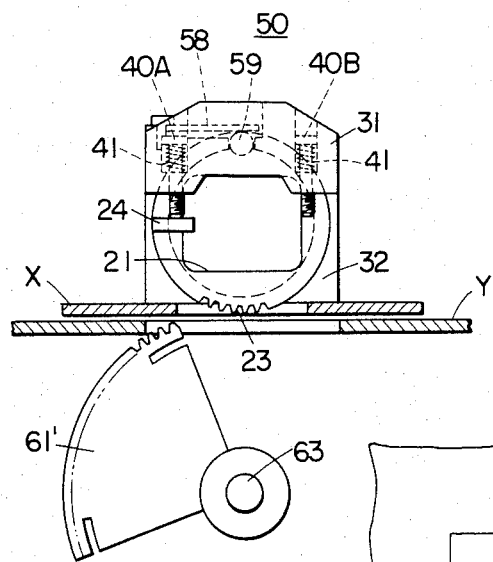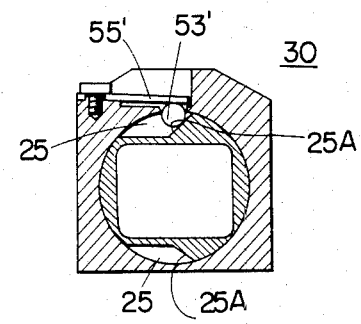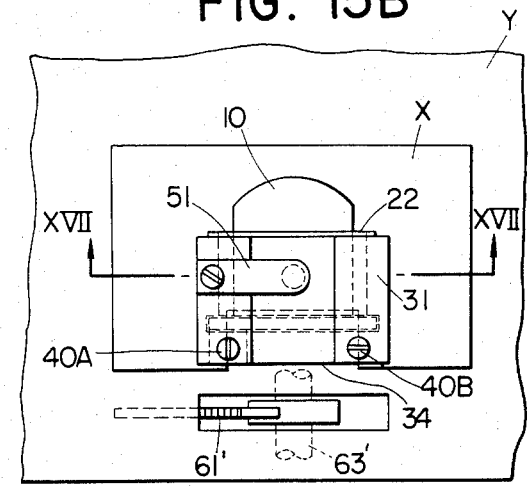

MAGNETIC HEAD SYSTEM FOR TAPE PLAYER

BACKGROUND OF THE INVENTION

The present invention relates in general to a magnetic head system for tape players of the auto-reverse type, and in particular to such a system capable of automatically change tracks of the magnetic tape by rotation of the magnetic head both in recording and reproduction.

In the prior art, various attempts have been made to develop tape players capable of playing multi-track magnetic tape players continuously from track to track by automatically shifting into the next track at the end of travel of each track. In some examples such as eight-track endless reproduction systems and four-channel recording and reproduction systems the magnetic tape is switched from one track to the next while being run along the head only in one direction. Other types of apparatus are characterized by two-way (forward and reverse directions) drive of the tape both for recording and reproduction operation, in which change of the tracks may be effected in one of the following three main methods: (1) The method by which the multi-track magnetic tape is played by a magnetic head assembly comprising operational heads corresponding in number to the tape tracks. (2) The method by which the multi-track magnetic tape is played by a single magnetic head having an operational tape-playing tracks arranged across its front core gap corresponding in number to the tape tracks. The required track is picked up by line connection in the magnetic head core circuit. (3) The method by which the multi-track magnetic tape is played by a movable magnetic head having operational tape-playing tracks arranged across the front core gap relatively less in number than the tape tracks, which magnetic head is designed to be shifted traversely across the tape face to pick up the required track.

Neither of the above mentioned methods, however, has been found acceptable for use with tape players of the type in which the magnetic tape is run in both forward and reverse directions for operation, particularly in view of their inability to provide for proper azimuth adjustment required for optimum recording and reproduction. In addition, method (1) has been found to suffer from several drawbacks. First, the number of magnetic heads required to meet the number of the tape has led to an increase of manufacturing cost. Secondly, because of the increased surface area of the tape face in contact with the tape playing surface of the multi-head unit, undesirably great reaction forces tend to act on the tape face in the opposite direction to that of travel of the tape, with the resulting tendency of developing wow and flutter. Head systems utilizing the principle of method (2), on the other hand tend to cause cross-talk between adjacent tracks in recording and reproduction operation because of the limited narrow band width of the individual tracks. Method (3) poses difficulties in obtaining mechanical precision to insure correct positioning of the head into the track at change of tracks.

In order to eliminate the above mentioned disadvantages a rotatable magnetic head system, such as the one illustrated in FIG. 1A to FIG. 1C, has been developed which comprises a single magnetic head capable of playing the magnetic tape continuously from track to track both in recording and reproduction. In operation, the tracks of the magnetic tape are traversed by rotation of the magnetic head about its axis. A magnetic head system similar to the one shown in FIGS. 1A to 1C can be applied in tape players of the cassette type, and usually comprises a magnetic head 10 including a magnetic core designed for application to two-track (two-channel) magnetic tapes, a supporting arm 2 to support the magnetic head at its one end, a rotating shaft 4 rotatively disposed and axially affixed at its one end to the other end of the supporting arm for rotation thereof, and a gear wheel 5 concentrically made integral with the rotating shaft 4 and operatively connected to a suitable drive means (not shown) such as a motor-driven gear system which is in mesh engagement with the gear wheel 5. A rotating arm 3 is fixedly retained to the supporting arm 2 in such a manner to extend perpendicular to the axis of the rotating shaft 4, so that the rotating arm 3 rotates with the gear wheel. The magnetic head has at least two tape-playing surfaces, or magnetic core front gaps, substantially 180° spaced apart from each other along its circumference. With this arrangement, when the first track of the magnetic tape, in operation, has reached its end on one of the tape-playing surfaces, the drive means automatically acts to rotate through the rotating shaft 4 the magnetic head 10 so as to bring the other tape-playing surface in contact with the next track of the tape which is simultaneously to proceed in the opposite direction. In this manner, continuous recording and reproduction can be obtained. The rotating shaft 4 is rotatively disposed on a support frame 6 that is secured on a conventional head slide plate (not shown). The support frame is provided at opposide end with a pair of azimuth adjusting screws 7a and 7b with the interposition of springs. These two azimuth adjusting screws 7a and 7b extend through the support frame to abut against the rotating arm 3 to thereby prevent it from rotation beyond restrictive rotational points determined by the lower end of the screws. The azimuth adjusting screws 7a and 7b can be rotated in either direction to change the position of the restrictive rotational points to obtain the optimum azimuth angle, or contact angle of the magnetic head with respect to the face of the tape loaded. The two azimuth adjusting screws are intended for adjustment in forward and reverse tape drive, respectively.

In this manner, the rotatable magnetic head system can perform automatic change of tracks while at the same time changing the direction of travel of the tape from the forward to reverse track with the rotation of the magnetic head about its axis through an angle of 180°. These prior art rotatable magnetic head systems have been found advantageous in many respects. For example, it is well known that they have found successful application in tape players of the cassette type having tape drive systems in which the magnetic tape is driven in both directions, forward and reverse. In addition, these magnetic head systems are known to be able to operate efficiently with stereo magnetic heads as well.

However, there conventional magnetic head systems of the rotatable head type, while adequate in operation, have some mechanical problems, mainly because of their characteristic structural design; the magnetic head in the supporting arm being rotated between tape playing positions to change tracks of the magnetic tape to be played by a gear wheel that is mounted on the substantially same rotatable shaft as the head supporting arm is carried. Since the principal components of the magnetic head system of this type are usually arranged in tandem, one after another, the distance l from the magnetic head to the gear wheel for directly rotating the head tends to increase. This stands against the present-day trend of the general adoption towards the smaller design such as represented by small-size and thin-cabinet compact type cassette decks.

SUMMARY OF THE INVENTION

The present invention is directed to magnetic head system of the rotatable magnetic head type for tape players free from the above mentioned disadvantages. It is, therefore, the principal object of the present invention to provide such a magnetic head system which is simple in mechanism with minimum mechanical components and is relatively compact, so that the distance from the magnetic head to the gear wheel adopted for directly rotating the head can be reduced.

BRIEF DESCRIPTION OF THE DRAWINGS

Other objects and advantages will be apparent from the following description and drawings in which:

FIGS. 13A to 13C are front, plan, and side views of a still further embodiment of the present invention;

FIGS. 15A to 15C are front, plan, and side views of a still further embodiment of the present invention;

FIG. 17 is a sectional view taken along the line XVII to XVII of 15B;

DETAILED DESCRIPTION OF THE EMBODIMENTS

One preferred embodiment of the magnetic head system constructed in accordance with the present invention will hereinafter be described in detail.

Figure 1A:
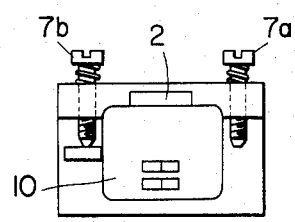
FIGS. 1A to 1C are front, plan, and side views of prior art magnetic head system for tape players.
Figure 1B:
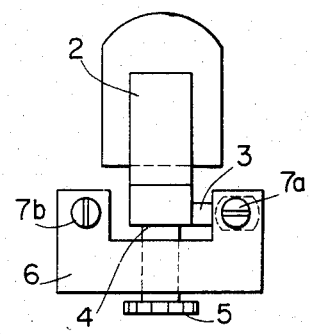
Figure 1C:
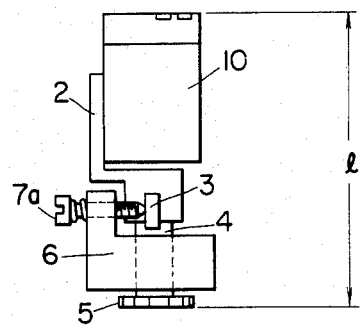
Figure 2A:
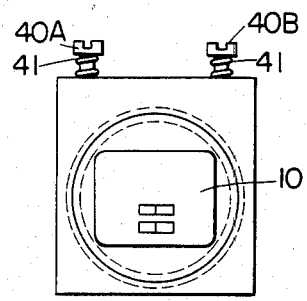
FIGS. 2A to 2D are front, plan, side, and rear views, respectively of one embodiment of the magnetic head system according to the present invention.
Figure 2B:
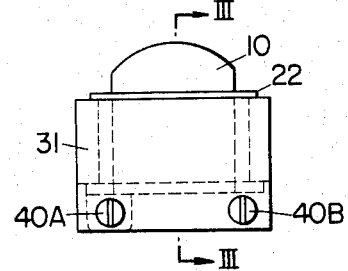
Figure 2D:
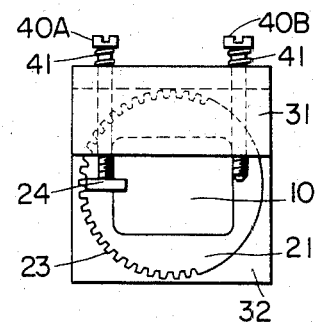
Figure 2C:
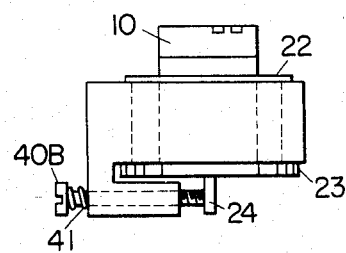
Figure 3:
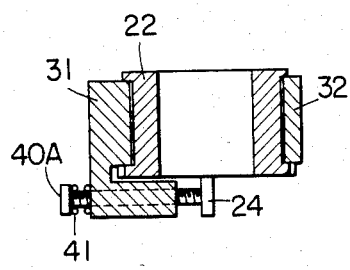
FIG. 3 is a cross-sectional view taken along the line III—III of FIG. 2B.
Figure 4:
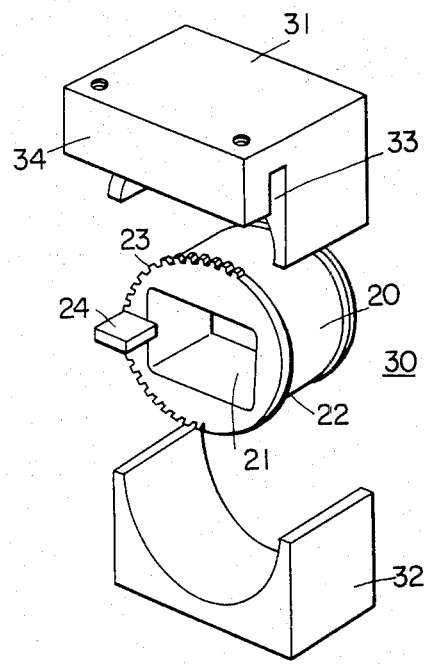
FIG. 4 is an exploded perspective view of the rotary drum and housing of the system.

FIGS. 2A through 5B present the various views of the preferred embodiment of the magnetic head system for tape players of this invention. Referring first to FIGS. 2A and 3, the numeral 20 generally indicates a magnetic head rotary drum of generally oval cross-sectional configuration which includes an axially extending bore 21 to enlcose therein a magnetic head 10 and flange portions 22 at its either end. In the system the magnetic head 10 may be of the type capable of operation both for recording and reproduction of the sound. The rotary drum 20 has its one flange portion 22 provided with a toothed rim 23 along its circumference. From the flange portion having the toothed rim projects a rotating arm 24. Further, the rotary drum 20 is rotatively disposed in a housing 30, which may be composed of two halves; the upper housing 31 and the lower housing 32 generally circular their inner walls. The upper housing 31 is formed a slit 33 through which the rotary drum 20 can in rotation pass the toothed rim 23. A tab portion 34 is separated from the upper housing by the slit 33 and is formed with a pair of tapped holes extending parallel to the plane of rotation of the toothed rim. It is preferable that the paired flange portions 22 including the toothed rim 23, the upper and lower housing 31 and 32, the rotary drum, and the rotating arm 24 are of an integral construction of nonmagnetic material (such as synthetic resins and zinc alloys). The tapped holes in the tab portion 34 of the upper housing 31 are provided to receive therethrough a pair of azimuth adjusting screws 40A and 40B with the interposition of springs 41. Each of these azimuth adjusting screws can be turned through the respective tapped hole to allow its tip to abut against the rotating arm 24 on the rotary drum at any desired depth. The points or positions at which the rotation of the rotating arm is restricted by the tips of the azimuth adjusting screws determine the azimuth angle of the magnetic head for the forward and the reverse tracks, respectively, of the magnetic tape. In this manner, therefore, the restrictive angular positions of the rotary drum 20 can be adjusted for better performance of the magnetic head to play the tape.

In this arrangement, it is preferable to provide a magnetic locking means including a magnet attached to the rotating arm 24 and a plate of magnetic material secured on the housing 30. When the drive means brings the rotary drum 20 near to the restrictive rotational position, magnetism acting between the magnet and the magnetic material plate grows stronger so that the rotary drum 20 will be rotated faster and comes to be retained in position when the rotating arm 24 abuts against the tip of the corresponding azimuth adjusting screw.

Figure 5A:
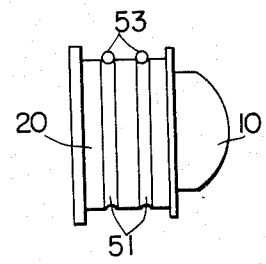
FIGS. 5A and 5B are illustrations of roller means used in the rotary drum and in the housing.
Figure 5B:
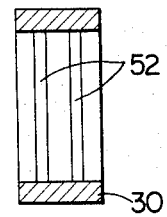

FIGS. 5A and 5B provide two different views of a roller means, indicated by the numeral 50, which is provided for smooth rotation and close fit of the rotary drum 20 within the housing 30 when the rotary drum 20 is rotated to change the tracks of the tape. To describe in more detail, the roller means 50 comprises a pair of parallelly extending grooves 51 and 51 formed in the outer circumference of the rotary drum 20, another pair of parallelly extending grooves 52 and 52 formed in the inner circular wall of the housing 30 in an overlapping manner with the paired grooves 51 and 51, and a plurality of steel balls 53 arranged within the tubular space defined by each of the grooves 51 in conjunction with its corresponding groove 52 in the housing 30.

The magnetic head system having the above mentioned arrangement is installed in the tape player with its lower housing 32 rigidly secured to a conventional head slider plate (not shown) and is connected to the drive system (not shown) which is in mesh engagement with the toothed rim 23 to rotate in conjunction with the roller means 50 the rotary drum 20 carrying the magnetic head 10 within the housing 30.

The drive system to rotate the toothed rim 23 of the rotary drum 20 may be a combination of a power source such as a motor and a rack mechanism which in turn comprises a power-driver plunger and a slider (or a rack) connected in mesh to the toothed rim 23 and slidably disposed on a stationary mounting in the chassis and connected to the plunger for sliding movement to rotate the rotary drum. Alternatively, a gear mechanism comprising a motor and a drive gear driven from may be used to drive the toothed rim 24.

However, the rotary member may be directly connected to the motor without such intervening elements such as a rack mechanism and gear mechanism.

Apart from the above mentioned examples, there are various other means considered appropriate as the drive means for operation of the magnetic head system of this invention.

Operation of the magnetic head system will hereinafter be described in accordance with the present invention. First, for the magnetic head system to play the forward track of the tape, assuming that the azimuth adjusting screw 40A determines the restrictive angular position of the rotary drum 20 to set the magnetic head 10 to play the forward track, the drive means, which may be connected to the toothed rim 23 in a manner as shown in FIGS. 2A to 2D, must retain the rotary drum at this restrictive position with the rotating arm 24 on the rotary drum 20 abut against the corresponding azimuth adjusting screw. If azimuth adjustment is required for the magnetic head set to this forward track position, the azimuth adjusting screw 40A shall be turned to alter the angle of restrictive angular position of the rotary drum 20 so as to obtain the optimum azimuth angle, or contact angle of the magnetic head 10 relative to the face of the tape (not shown).

Then, the magnetic head system will be transferred automatically to the next reverse track at the end of the forward track operation through the reverse movement of the drive means, rotating the toothed rim 23 on the rotary drum 20 in a counter-clockwise direction in the drawing, until the rotating arm 24 on the rotary drum 20 is abut against the tip of the azimuth adjusting screw 40B. Similarly, the azimuth adjusting screw 40B can, if required, be turned to adjust the azimuth angle, or contact angle of the magnetic head 10 relative to the face of the tape (not shown).

In this particular embodiment, the housing for enclosing the rotary drum is composed of two halves, i.e., the upper and lower housings. However, it may be the one made of one-piece. In this case, the rotary drum must instead be manufactured in split pieces to be assembled into the housing. For example, one of the flange portions and the remaining part of the rotary drum may be separately constructed for later putting together into the housing.

In this particular embodiment again, the roller means consists of overlapping pairs of grooves cut in the outer circumference of the rotary drum and the inner surface of the housing, respectively. However, as an alternative means, roller bearings which are suitably located somewhere between the housing and the supporting drum may serve for the same purpose as well.

FIGS. 6A to 10 present the various views of another embodiment of the magnetic head system of this invention. Referring to the drawings, the numeral 20 indicates largely a magnetic head carrying rotary drum of generally oval cross-section configuration which includes a flange portion 22 at its one end and an axially extending bore 21 to enclose therein a magnetic head 10. In this system the magnetic head 10 may be designed to be able to operate for recording and reproduction of the sound. The flange portion 22 is provided along its periphery with a sector gear 23 having a continuous toothed arc of approximately 180°. A rotating arm 24 is secured to that side of the rotary drum 20 which has the flange portion with the sector gear and projects therefrom largely in the direction parallel to the axis of the rotary drum. A circumferential groove 25 is formed in the outer circumference of the rotary drum 20 in such a manner as to run parallel to the plane of rotation of the rotary drum. The rotary drum 20 is rotatively disposed in a housing 30, which may be composed of two halves; the upper housing 31 and the lower housing 32 both generally circular in their inner walls. The upper housing 31 is formed with a slit 33 through which the rotary drum 20 can in rotation pass its sector gear 23. A tab portion 34 is separated by the slit 33 from the upper housing and is provided with a pair of tapped holes extending parallel with the plane of rotation of the sector gear. The upper housing 31 has its inner surface drilled with a radial hole 28 which, together with the circumferential groove 25 constitutes part of a tensioning means 50 to be explained in detail later. It is preferable that the flange portion 22 including the gear sector 23, the rotary drum, and the rotating arm 24, the upper housing 31 and the lower housing 32 are of an integral construction of non-magnetic material such as synthetic resins and zinc alloys. The paired tapped holes in the tab portion 34 of the upper housing 31 are provided to receive therethrough azimuth adjusting screws 40A and 40B with the interposition of springs 41 and 42. Each of these azimuth adjusting screws can be turned in either direction through the respective tapped hole to allow its tip to abut against the end of the rotating arm 24 on the rotary drum at any desired depth. The points or positions at which the rotation of the rotating arm is limited by the tips of the azimuth adjusting screws determine the azimuth angle of the magnetic head for the forward and the reverse track, respectively, of the magnetic tape. In this manner, the restrictive angular positions of the rotary drum 20 can be adjusted for better performance of the magnetic head to play the tape. The tensioning means 50 comprises the combination of a a helical spring 51 and a steel ball 52 which is mounted between the housing 31 and the rotary drum 20. The helical spring 51 is seated on the bottom of the radial hole 28 in the upper housing 31 and is engaged at its top end with the steel ball 52 to urge the latter into engagement with the circumferential groove 25 formed on the outer periphery of the rotary drum 20, the circumferential groove being cut in such a manner that, as the rotary drum is rotated relative to the upper housing 31 the groove can move in continuous engagement with the steel ball. With this arrangement, the tensioning means 50 serves to minimize the undesirable axial movements of the rotary drum 20 that may occur when the rotary drum is rotated within the housing thus ensuring a close fit therein. A drive means, generally indicated by the numeral 60, is provided to actuate the sector gear 23 of the rotary drum 20. This drive means comprises a rack 61 or a straight length of toothed gearing. The rack 61 is slidably carried on a shaft 62 which is in turn supported at its both ends on a frame 63 that is also slidably disposed on its mounting for sliding movement in the direction paralell to the shaft 62. A pair of helical springs 64 and 65, respectively, are provided on the shaft 62 on both sides of the rack 61 in such a manner to urge the rack in opposite directions. The sliding movement of the frame 63, causes the rack 61 to move longitudinally along the shaft 62 between the helical springs 64 and 65.

Figure 6A:
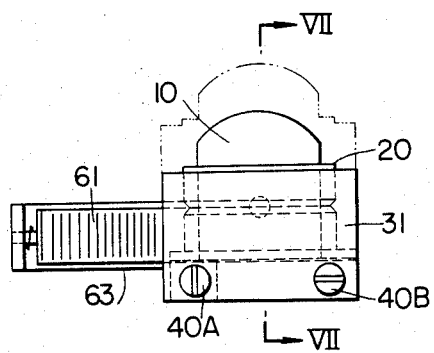
FIGS. 6A to 6C are plan, side, and rear views of another embodiment of the present invention.
Figure 6B:
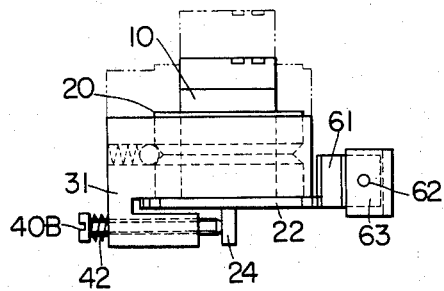
Figure 6C:
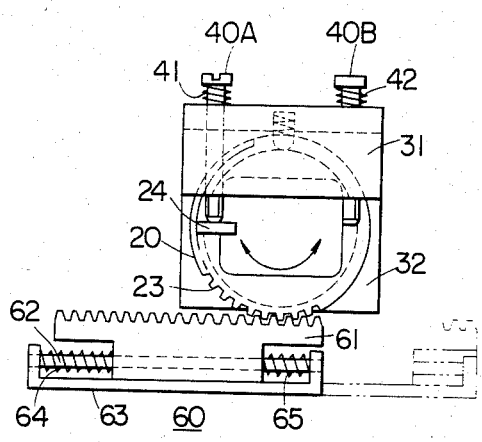
Figure 9:
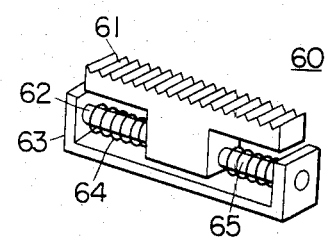
FIG. 9 is a perspective view of the drive means taken from FIG. 6C.
Figure 7:
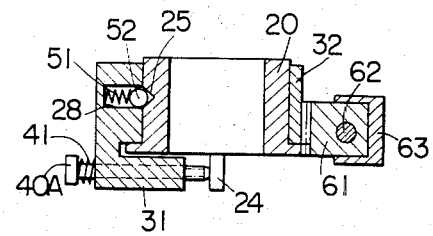
FIG. 7 is a sectional view taken along the line VII—VII of FIG. 6A.
Figure 8:
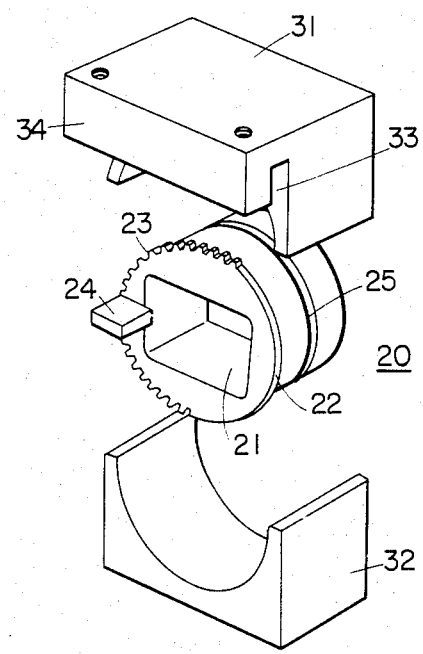
FIG. 8 is an exploded perspective view to show the rotary drum of FIGS. 6A to 6C.
Figure 10:
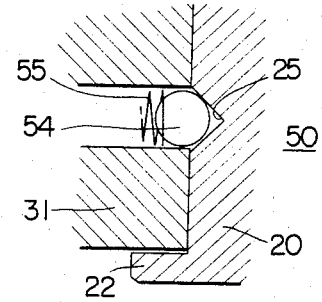
FIG. 10 is a partially enlarged view of a portion of FIG. 7.

Although the principle of the system should be now be apparent from the above description, the operation of the present invention will be explained in more detail in the interest of clarity. Referring to FIGS. 6A to 6C, first, for the magnetic head 10 to shift into the forward track of the tape, assuming that the restrictive angular position determined by the azimuth adjusting screw 40A is the position of the magnetic head for the forward track, the frame 63 of the drive means 60 must be slided to the left-hand position in the drawing by a suitable means, which is connected to the system to slide the frame 63 between two positions for forward and reverse drive of the tape, but which will not be described herein. Following the leftward movement of the frame, the rack 61 will also be moved in the same direction as the rack by the force of the helical spring 65 to thereby rotate the sector gear 23 which in turn urges the magnetic head into the position depicted in the same drawing. In the course of rotation of the magnetic head within the upper housing 31, the steel ball 52 of the tensioning means 50 serves to guide the rotation of the rotary drum 20 through the circumferential groove 25 in the rotary drum 20. When the magnetic head is in the aforesaid tape forward drive position, the rotating arm 24 on the rotary drum 20 abuts against the tip of the azimuth adjusting screw 40A, thereby preventing the rotary drum 20 from further rotation beyond that position. With the magnetic head 10 in the rotary drum 20 to play forward track of the tape, azimuth adjustment can, if necessary, be made by turning this azimuth adjusting screw against the direction of action of the helical spring 65 which urges the rotary drum towards the above azimuth adjusting screw to thereby alter the restrictive angular position of the rotary arm. In this manner, the magnetic head can be set to the proper azimuth angle or contact angle of the magnetic head relative to the face of the magnetic tape.

The tensioning means 50 is designed such that the steel ball 52 urged towards the rotary drum 20 by the helical spring 51 is continuously engaged with the circumferential groove 25 when the rotary drum is rotated within the housing. The strength of the helical spring is selected to press through the steel ball on the rotary drum 20 in the radial direction with a force sufficient to eliminate the undesirable axial movement of the rotary drum 20 that may occur when the latter is rotated within the housing 30. Also, this tensioning means serves to prevent the rotary drum 20 from unintendedly displacing or falling off from within the housing 30. This aspect of the features of the tensioning means will be described in more detail with respect to FIG. 10 which is a partially enlarged view of a portion of FIG. 7. In determining the inner diameter of the housing 30, the outer diameter of the rotary drum 20, and the dimensions of the circumferential groove 25, it is necessary to consider the following three points in order to minimize to a minimum possible extent such objectionable axial movements of the rotary drum 20 within the housing 30, i.e., the point (a) on the steel ball 52 in contact of which the rotary drum 20 is made to rotate, the point (b) at which the steel ball 52 is in contact with the upper housing 31, and the point (c) on the upper housing 31 along which the flange portion 22 on the rotary drum 20 is made to rotate. The force of the helical spring 51 acts in the direction (d) on the steel ball 52 which in turn pushes on the rotary drum 20 at the point (a) in the direction (e). Therefore, when the force of the helical spring is utilized to press the flange portion 22 of the rotary drum 20 against the housing at the point (c) in the above mentioned manner, the rotary drum can be firmly retained in position for operation.

The counter force developed in the helical spring 65, when it is compressed by the frame 63 of the drive means 60 in its left-hand position, acts to constantly urge the rotating arm 24 of the supporting drum 20 against the lower end of the azimuth adjusting screw 40A, so that azimuth adjustments that are once established will remain unimpared by external influences, even when there have been involved some fluctuations in the sliding movement of the frame 63 to change tracks of the tape. This is also true with the case when the magnetic head system is switched to the position to play the reverse track of the tape. In this position, the helical spring 64 urges the azimuth adjusting screw 40B in a similar manner.

The magnetic head system having the above mentioned arrangement is installed in the tape player with its lower housing 32 rigidly secured on a conventional head slide plate (not shown), whereas the drive means 60 be fixedly mounted on a stationary chassis (not shown) on which the head slide plate is slidably disposed. The drive means 60 is connected in mesh with the sector gear 23 on the rotary drum 20 to rotate the magnetic head 10 about its axis within the housing 30. In FIGS. 6A and 6B, the position that the magnetic head 10 and the housing 30 are to assume, when the head slider plate is advanced, is depicted by broken line.

As have been described above, the housing 30 carrying the rotary drum 20 is fixedly mounted on the head slider plate, whereas the frame 63 of the drive means 60 be secured on the stationary chassis with the head slider plate slidably disposed on the chassis to slide in the direction perpendicular to the axis of the rotary drum 20. In this instance, it should be noted that the traverse width across the teeth of the rack 61 is greater than the entire distance of travel of the head slider plate relative to the chassis, so that the sector gear 23 is invariably in mesh engagement with the rack regardless of the sliding position of the head slider plate. Further depending on the arrangement of the drive means, the housing 30 and the drive means 60 may be located both on the head slider plate, the stationary chassis, or any other place.

For the system to transfer from tape forward to tape reverse drive position, the frame of the drive means 60 must be slided by the sliding means (not shown) to the righthand position, which is the movement to the opposite direction to that in which the magnetic head is moved for forward tape drive. Now, this movement of the frame rotates the sector gear 23 in a counterclockwise direction. The sector gear 23 will also be rotated until the rotating arm 24 on the rotary drum 20 abuts against the azimuth adjusting screw 40B. Similarly, when azimuth adjustment is required for the magnetic head 10 in the reverse track, the azimuth adjusting screw 40B shall be rotated to alter the restrictive angular position of the rotary drum 20 until the required azimuth angle, or contact angle of the magnetic head 10 relative to the face of the tape loaded is obtained for optimum recording and reproduction performance.

In this particular embodiment, the tensioning means is designed to urge the rotary drum in the radial direction in conjunction with the circumferential groove 25 formed in the periphery of the rotary drum. However, as an alternative measure, the tensioning means may be installed somewhere in the flange portion in such a manner as to bias the rotary drum in the axial direction against the flange portion. In this case, the groove must be formed somewhere in the end wall of the flange portion. Further, instead of a single steel ball-and-spring combination of this embodiment a plurality of steel ball-and-spring combinations may be arrayed suitably spaced apart from one another along the groove. Still further, the rotary drum may have plural circumferential grooves with the correspondingly increased number of steel ball-and-spring combinations; one combination for each groove, two for each, and so forth. Furthermore, the groove or grooves may be cut to progressively decrease in depth according as the rotating arm comes closer to the azimuth adjusting screw, so that the rotating arm, while being rotated between the tape forward and tape reverse drive positions with the less magnitude of tensioning force, will be imparted with the greater degree of tensioning force, in addition to the force of the helical springs 64 and 65 of the drive means, to be able to hold itself stably in position at the respective restrictive angular points.

In this particular embodiment, in order for the magnetic head to be retained in position at the restrictive rotational points to play the forward and reverse tracks of the tape, a pair of helical springs are employed on both sides of the rack in the drive means. However, a torque generating system of the type utilizing a single spring may be adapted to offer similar effects.

Figure 11A:
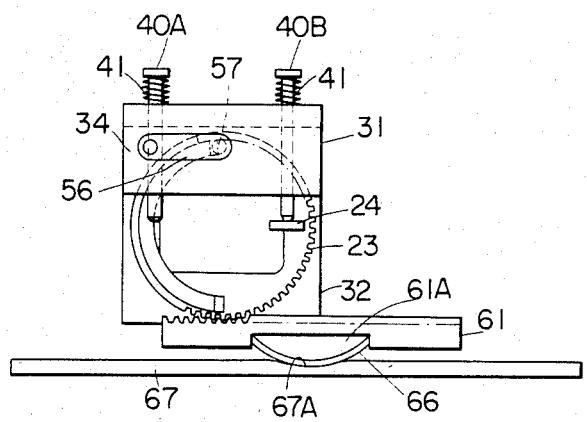
FIGS. 11A to 11C are front, plan, and side views of a further embodiment of the present invention.
Figure 12:
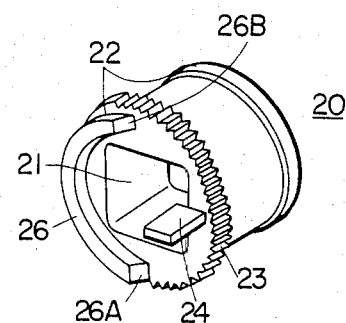
FIG. 12 is a perspective view of the rotary drum used in the embodiment of the above drawings.

FIGS. 11A to 12 present the different views of a further embodiment of the magnetic head system of this invention. Referring to the drawings, the numeral 20 generally designates a magnetic head carrying rotary drum of generally oval cross-section configuration which includes flange portions 22 at its both ends and an axially extending bore 21 to enclose therein a magnetic head 10. In this head system the magnetic head 10 may be of the type capable of operation both for recording and reproduction. One of the flange portion 22 is provided along its periphery a sector gear 23 having a continuous toothed arc of approximately 180°. A rotating arm 24 is secured to that side of the rotary drum which has the flange portion with the sector gear. Also, on the same side of the rotary drum 20 is provided an arcuate projection 25 similar in shape to the 180° arc of a circle. The arcuate projection 25 has sloped ends 25A that are cut at an angle in such a manner that the longitudinal length of the arcuate projection is longer along the bottom center line than along the top center line. The rotary drum 20 is rotatively disposed in a housing 30, which may be composed of two halves; the upper housing 31 and the lower housing 32 both generally circular in their inner walls. The upper housing 31 is formed with a slit 33 through which the rotary drum 20 can in rotation pass its sector gear 23. A tab portion 34 is separated by the slit 33 from the upper housing and is provided with a pair of tapped holes extending parallel with the plane of rotation of the rotary drum 20. The upper and lower housings 31 and 32, the flange portions 22 including the sector gear 23, the rotary drum, and the rotating arm 24 are preferably of an integral construction of nonmagnetic material such as synthetic resins and zinc alloys. The paired tapped holes in the tab portion 34 of the upper housing 31 are provided to receive therethrough a pair of azimuth adjusting screws 40A and 40B with the interposition of springs 41 and 42. Each of these azimuth adjusting screws can be turned in either direction through respective tapped hole to allow its tip to abut against the rotating arm 24 at any desired angle. The points or positions at which the rotating arm is restricted by the tips of the azimuth adjusting screws determine the azimuth angle of the magnetic head for forward and reverse tape track drive, respectively. In this manner, the restrictive angular positions of the rotary drum 20 can be adjusted for better performance of the magnetic head to play the tape. A locking means, generally indicated by the numeral 50, comprises a leaf spring 56 and an engaging pin 57 secured to one end of the leaf spring. The other end of the leaf spring 56 is fixed to the upper surface of the tab portion 34. This locking means 50 is so designed that, when the rotary drum 20 has been rotated to the restrictive angular positions, the engaging pin 57 on the leaf spring 56 will engage the corresponding sloped end 26A of the arcuate projection 26, so as to hold the rotary drum within the upper housing 31. The numeral 60 indicates generally a drive means which comprises a rack 61, a leaf spring 66, and a slide plate 67 slidable disposed on a stationary mounting. This drive means connected in the system to drive the sector gear 23 on the rotary drum 20 through the rack 61 which is connected in mesh with the sector gear. The slide plate 67 has in its upper surface an arcuate groove 67A of large curvature. Further, the rack 61 is formed with a stepped portion 61A along its untoothed longitudinal edge. The leaf spring 66 is fitted into the stepped portion 61A to bend to a curve at middle, being larger in length than the lateral width of the stepped portion 61A, thrusting its bent portion into the arcuate groove 63A. Thus, the tension of the spring in engagement with the arcuate groove not only insures the transmission of the sliding motion of the slide plate 63 to the rack 61, but also strives to force the rack 61 into engagement with the sector gear 23 on the rotary drum 20. It is to be noted that, though not shown in the drawings, the slide plate 63 is mechanically or otherwise connected to a suitable sliding means for operation, such as a power-driven plunger, or the like.

Figure 11B:
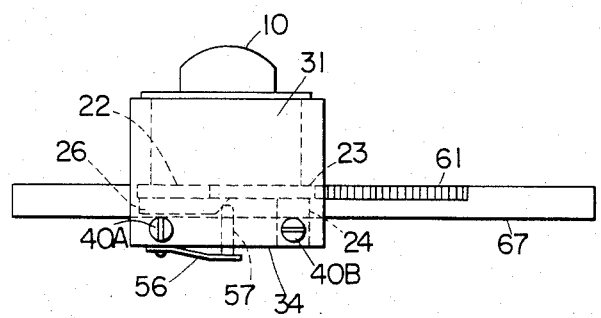
Figure 11C:
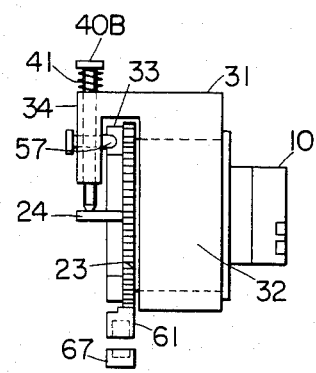

Operation of the magnetic head system of this invention will hereinafter be described in full detail. For the magnetic head 10 to play the forward track of the tape, assuming that the angular position determined by the azimuth adjusting screw 40A is the position of the magnetic head for playing the forward track, the slide plate 67 of the drive means 60 must be slided to the lefthand position by the sliding means (not shown), which will slide the slide plate to the righthand position for the reverse track of the tape. Following the sliding movement of the slide plate 67, the rack 61 is moved in the same direction as the slide plate through the leaf spring 66, rotating the rotary drum 20 with the sector gear 23 engaged with the drive means, as shown in FIGS. 11A to 11C. Simultaneously, the arcuate projection 26 on the rotary drum 20 is also turned while keeping in contact with the engaging pin 57 of the locking means 50 mounted on the upper housing 31. Where the rotary drum 20 is prevented from rotation by the rotating arm 24 on the rotary drum 20 through the corresponding azimuth adjusting screw, the magnetic head in the rotary drum 20 is held in position for the forward track. At this point where the rotating arm 24 on the rotary drum 20 abuts against the tip of the azimuth adjusting screw 40A, the locking means 50 on the housing 30 has its engaging pin 52 engaged with the sloped end 25A of the arcuate projection 25 on the rotary drum 20. If azimuth adjustment is required for the magnetic head system positioned for playing the forward track, the azimuth adjusting screw 40A shall be turned against the direction of action of a helical spring 65 that urges the rotary drum 20, so as to alter the restrictive angular position of the rotary drum 20. In this manner, the magnetic head 10 can have the optimum azimuth angle, or contact angle of the head relative to the face of the tape (not shown).

During the rotation of the rotary drum 20, since the locking means 50 keeps to press the engaging pin 52 against the arcuate projection 26 on the rotary drum 20 by the action of the leaf spring 56, the rotary drum 20 will be constantly urged in the axial direction against the housing 30. Thus, the objectionable axialy movements of the rotary drum while rotating can be minimized. Further, this axial tension would firmly hold the rotary drum within the housing 30.

As have been described above, in accordance with the movement of the slide plate 67 at change of tracks of the tape, the rack 61 of the drive means 60 is moved, rotating the sector gear 24 until the rotary drum 20 reaches the restrictive angular position sweeping the rotating arm 24 into contact with the tip of the azimuth adjusting screw. However, the length of sliding stroke of the slide plate 67 is such that, after the rotating arm 24 has abutted against the tip of the azimuth adjusting screw, the slide plate 67 still has a certain length of stroke left to travel. The leaf spring 66 strives to absorb force that is being developed by the slide plate 67 completing the remaining portion of stroke, since the sector gear 24 will not further rotate being prevented by the rotating arm, until the leaf spring 66 is forced out of the arcuate groove 67A in the slide plate 67. Or, the leaf spring 66 may hold out by elastically warping. In either case, the rack 61 will be urged with increased force sufficient to allow it to hold the rotary drum 20 at the position where the rotating arm abuts against the tip of azimuth adjusting screw 40A. Therefore, azimuth adjustment can be made in a reliable condition, despite minor fluctuations in the sliding movement of the slide plate 67 at each change of tracks of the tape. This is also the same with the magnetic head positioned to play the reverse tracks as will be described later. In this case, the leaf spring 66 will urge the rotary drum in the direction to force the rotating arm into engagement with tip of the azimuth adjusting screw 40B.

The magnetic head system having the above arrangement may be installed in the tape player with its lower housing 32 rigidly secured on a conventional head slid plate (not shown), whereas the drive means 60 be fixedly mounted on a stationary chassis (not shown) on which the head slider plate is slidably disposed. The drive means 60 is connected in mesh with the sector gear 23 to rotate the rotary drum 20 carrying the magnetic head 10 about its axis within the housing 30.

Where the housing 30 carrying the rotary drum 20 is mounted on the head slide plate, with the rack 67 of the drive means 60 secured on the stationary chassis, as mentioned above, it is to be noted that the traverse width across the teeth of the rack 67 is greater than the entire length of travel of the head slide plate 61, so that the drive gear is maintained in constant engagement with the sector gear 23 for rotation of rotary drum 20, regardless the sliding position of the slide head slide plate. As an alternative measure, the housing 30 and the drive means 60 may be mounted together on the head slide plate, the stationary chassis, or, depending on the design of the drive means, on any other member in the tape player.

Then, the magnetic head system will be shifted automatically to the reverse track of the tape at the end of the forward track by the reverse movement of the drive means to rotate in a counter-clockwise direction the sector gear 23 that is engaged with the rack of the drive system 60 until the rotating arm 24 on the rotary drum 20 comes into contact with the tip of the azimuth adjusting screw 40B. Similarly, azimuth adjustment shall, if necessary, be made by turning the azimuth adjusting screw 40B to alter the angle of restrictive angular point of the rotary drum 20, hence the azimuth angle of the magnetic head 10 relative to the face of the tape (not shown).

Furthermore, in this particular adjustment, the locking means is connected to the system in order to hold the rotary drum stably in position for operation, in conjunction with the arcuate projection 26 formed on the rotary drum, by biasing the rotary drum in the axial direction. Alternatively, however, the locking means may be so designed that it can exert axial force in conjunction with a proper form of restriction shaped to accord with the locking means and formed in the outerperiphery of the rotary drum beneath the housing. The locking means of this embodiment consists of the combination of one leaf spring and one engaging pin. However, a number of leaf spring-and-pin combinations may be provided on the housing suitably spaced apart from each other and arranged in an overlapping manner with the arc of the arcuate projection on the rotary drum. As still another alternative measure, the rotary drum may have a plural of such arcuate projection of different radii to be engaged by one or plural combinations of leaf springs-and-pins. The arcuate recess formed on the rotary recess has been explained above as the means for the engaging purposes. However, this also serves as the guide means for rotation of the rotary drum as well.

Further, the drive means of this embodiment employs a rack mechanism for transmitting power to the magnetic head system. However, a gear wheel or a sector gear on a power-driven shaft can substitute the rack to serve for the same purpose as well. In this case, the shaft on which the gear wheel is mounted must be engaged with springs, so that it can actuate the sector gear to bias the rotary drum towards the restrictive angular position.

Figure 14:
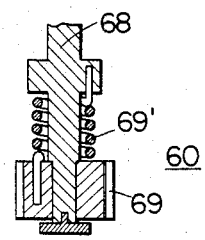
FIG. 14 is a cross section of the drive means used in the embodiment of the FIGS. 13A to 13C.
Figure 13A:
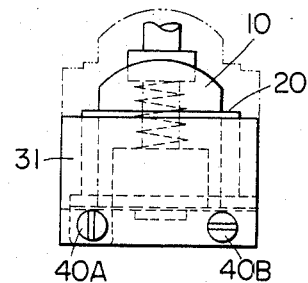
Figure 15C:
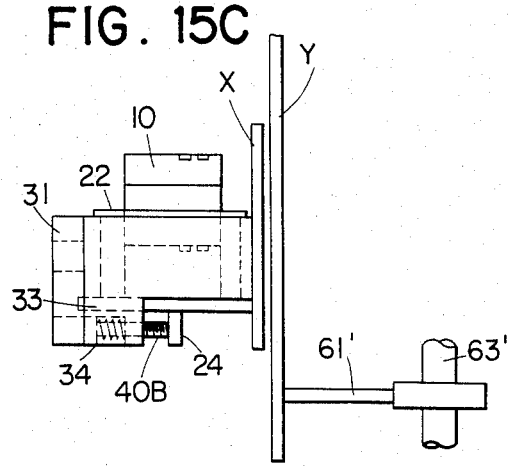
Figure 16:
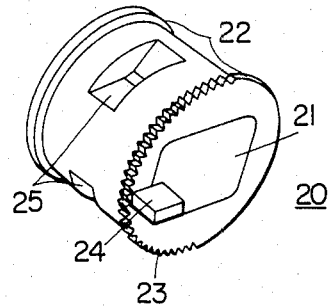
FIG. 16 is a perspective view of the rotary drum used in the embodiment of FIGS. 15A to 15C.

FIGS. 13A through 14 present the different views of a still further embodiment of the magnetic head system of this invention. Referring to the drawings, the numeral 20 indicates largely a magnetic head carrying rotary drum of generally oval cross-section configuration which includes a flange portion 22 at its one end and an axially extending bore 21 to enclose therein a magnetic head 10. In this system the magnetic head 10 may be designed to be able to operate for recording and reproduction of the sound. The flange portion 22 is provided along its periphery with a sector gear 23 having a continuous toothed arc of approximately 180°. A rotating arm 24 is secured to that side of the rotary drum 20 which has the flange portion with the sector gear and projects therefrom largely in the direction parallel to the axis of the rotary drum. A circumferential groove 25 is formed in the outer circumference of the rotary drum 20 in such a manner as to run parallel to the plane of rotation of the rotary drum as in the embodiment shown in FIG. 8. The rotary drum 20 is rotatively disposed in a housing 30, which may be composed of two halves; the upper housing 31 and the lower housing 32 both generally circular in their inner walls. The upper housing 31 is formed with a slit 33 through which the rotary drum 20 can in rotation pass its sector gear 23. A tab portion 34 is separated by the slit 33 from the upper housing and is provided with pair of tapped holes extending parallel with the plane of rotation of the sector gear. It is preferable that the flange portion 22 including the gear sector 23, the rotary drum, and the rotating arm 24, the upper housing 31 and the lower housing 32 are of an integral construction of non-magnetic material such as synthetic resins and zinc alloys. The paired tapped holes in the tab portion 34 of the upper housing 31 are provided to receive therethrough azimuth adjusting screws 40A and 40B with the interposition of springs 41 and 42. Each of these azimuth adjusting screws can be turned in either direction through the respective tapped hole to allow its tip to abut against the end of the rotating arm 24 on the rotary drum 20 at any desired depth. A drive means, generally designated by the numeral 50, comprises a drive shaft 68 which is connected to a power transmission system (not shown) for rotation, a drive gear 69 which is rotatively carried on the drive shaft 68, and a spring 68' which is mounted about the drive shaft. The drive gear is engaged with the sector gear on the rotary drum for rotation thereof. The spring has its ends secured to the drive shaft 68 and the drive gear 69, respectively for transmitting the rotational motion in both directions of the drive shaft to the drive gear 69. This drive means is mounted adjacent to the assembled body of the housing 30 carrying the rotary drum 20, with the axis of the drive shaft 68 parallel with that of the rotary drum, such that the rotational movement of the drive shaft 68 is transmitted to the gear sector through the spring 68'.

The power transmission system connected to the drive means 50 for actuation may take various forms to drive the rotary drum 20 through the sector gear 23. For example, a gear mechanism which is driven by a plunger driven slider (or a rack) may be operatively connected to the drive shaft 68 on the side opposite to that on which the drive gear 52 is mounted. Alternatively, a motor-driven gear wheel may be employed to drive the drive shaft 68 of the drive means. Apart from the above examples, there are a variety of devices applicable for use with the drive system of this invention.

Operation of this embodiment will be described in full detail as follows. First, for the magnetic head system to play the forward track of the tape, the drive shaft 68 of the drive means must be rotated in a clockwise direction in FIG. 13C by the power transmission system (not shown), which is adapted to drive means to rotate selectively the drive shaft 68 in opposite directions according to the direction of travel of the tape to be played. This rotation of the drive shaft 68 is transmitted through the coil spring to the drive wheel 69 which in turn will rotate in the same direction as the drive shaft 68. Then, the drive gear 69 that is in mesh engagement with the sector gear 23 as shown in FIG. 13C, on the rotary drum 20 will oscillate the sector gear 23 in a counterclockwise direction, rotating the rotary drum 20, until the rotating arm 24 on the rotary drum 20 comes into abutting engagement with the tail of the azimuth adjusting screw 40A. In this manner, positioning of the head 10 for forward tape drive is achieved. If azimuth adjustment is required for the magnetic head system positioned for forward track drive, the azimuth adjusting screw 40A shall be rotated to alter the angle of restrictive rotative position of the rotary drum 20 so as to obtain proper azimuth angle, or contact angle of the magnetic head 10 relative to the face of the tape (not shown).

The magnetic head system will be shifted to the position to play the reverse track at the end of the forward track through the rotation of the power transmission system in a clockwise direction. This clockwise rotation of the power transmission system, and hence the drive means causes the rotary drum 20 to rotate in a counterclockwise direction through the sector gear 23 until the rotating arm 24 on the rotary drum 20 comes into contact with the tip of the azimuth adjusting screw 40B. Similarly, azimuth adjustment for the magnetic head system set to the reverse track position is, if necessary, made by turning the azimuth adjusting screw 40B to obtain the azimuth angle, or contact angle of the magnetic head 10 relative to the face of the tape (not shown).

The magnetic head system having the above mentioned arrangement is installed in the tape player with the lower housing 32 of the housing 30 rigidly secured on a conventional head slide plate (not shown), whereas the drive means 60 and the power transmission system (not shown) fixedly mounted on a stationary chassis (not shown) on which the head slide plate is slidably disposed. The rotary drum 20 carrying the magnetic head 10 is mounted for connection to the drive means 60 and is arranged to rotate about its axis with the sector wheel 23 thereon in mesh engagement with the drive gear 69 on the drive system. It is to be noted, again, that, in order to maintain constant intermesh between the drive gear 69 of the drive means and the sector gear on the rotary drum regardless of the position of the magnetic head, the traverse width across the teeth of the drive wheel is greater than the entire length of travel of the head slide plate which slides back and forth with the rotary-drum carrying housing thereon in the direction parallel to the axis of the rotary drum. FIGS. 13A to 13C illustrate the relative position in broken line the housing 30 with the rotary drum and the magnetic head 10 take when the head slide plate advances.

FIGS. 15A through 18 present different views of a still further embodiment of the magnetic head system of this invention. Referring to the drawings, the numeral 10 indicates generally a magnetic head for recording and reproduction of the sound. A rotary drum 20 of cylindrical cross section includes along its axis bore 21 to fittingly receive therein the magnetic head 10 and has its both ends flange portions 22. One of the flange portions 22 is provided with a toothed rim 23 having continuous arc of approximately 180° along its periphery, as can best be seen in FIG. 16. A rotating arm 24 is secured to the rotary drum and projects therefrom in the direction axially to the axis of the rotary drum. The rotary drum 20 is formed along its periphery with recesses 25 which are diametrically opposed or spaced apart 180° from each other. Further, each of the recesses 25 has at least one sloped wall 25A cut at an angle relative to the radius direction of the rotary drum 20. A head slide plate A is slidably mounted on a suitable stationary member in the tape player to slide between stop and play positions. On this head slide plate is mounted a housing 30, which may be composed of an upper housing 31 and a lower housing 32 both generally circular in their inner walls. The rotary drum 20 is rotatively disposed in the housing. The upper housing 31 is formed with a slit 33 through which the rotary drum 20 can in rotation pass its toothed rim 23. A tab portion 34 is separated by the slit 33 from the upper housing and is formed with a pair of tapped holes that extend parallel to the plane of rotation of the toothed rim. Preferably, the rotary drum, the flange portion 22 including the toothed rim 23, and the rotating arm 24, the upper housing 31 and the lower housing 32 are of an integral construction of nonmagnetic material (such as synthetic resins and zinc alloys). The head slider plate X may be slidably disposed on a chassis Y (not shown) for movement relative to the chassis Y. The respective tapped holes formed in the tab portion 34 of the upper housing 31 are provided to receive a pair of azimuth adjusting screws 40A and 40B, respectively, therethrough with the interposition of coil springs 41 and 42. Each of these azimuth adjusting screws can be rotated in the respective taped hole to allow its tip to abut against the rotating arm 24 on the rotary drum 20 at any desired depth. The points or positions at which the rotation of the rotating arm is limited in the housing by the tips of the azimuth adjusting screws determine the azimuth angles of the magnetic head for the forward and the reverse tracks, respectively, of the magnetic tape, a tensioning means, generally designated by the numeral 50, comprises a leaf spring 51 and a steel ball 52 affixed to one end of the leaf spring. The leaf spring 51 extends its end having the steel ball 52 through a slit formed in the upper housing 31 to reach the outer surface of the rotary drum 20, with its other end retained to the upper surface of the tab portion 34 by means of, for example, a screw. It is so arranged that, when the rotary drum has been rotated into the restrictive angular position, the tensioning means 50 will thrust its ball-loaded end of the leaf spring 51 into the corresponding recess 25 against the sloped side 25A for engagement, to thereby retain the rotary drum 20 in that position.

A drive means, generally indicated by the numeral 60, comprises a drive shaft 63' and a drive gear 61' which is carried on the drive shaft 63' for rotation. The drive shaft 63' is connected to a suitable means, not shown, to be rotated therefrom, and is so arranged to turn the toothed rim 23 of the rotary drum 20 through the drive gear 61'. The rotary motion of the drive gear 61' will be transmitted to the toothed rim 23, when the head slide plate A has been retracted to the stop position with the toothed rim 23 engaged in mesh with the drive gear 61' so as to bring the magnetic head to shift for change of the tracks.

The operation of the magnetic drive system will hereinafter be described in full detail. For the magnetic head to play the forward track of the tape, the head slide plate X on which the magnetic head system is mounted must be slided into the stop position. It is to be noted that at this point the drive shaft 63' of the drive means 60 has been connected to a suitable transmission means, which is designed to rotate the drive means in opposite directions for forward and reverse drive of the tape. Now, when the drive shaft 63' is actuated by the transmission means to rotate the drive gear 61' in a counter-clockwise, the toothed rim 23 that is engaged with the drive gear will also be rotated in a clockwise direction, until the rotating arm 24 on the rotary drum 20 comes into abutting engagement with the tail of the azimuth adjusting screw 40A mounted on the housing 30. At this restrictive position, the rotary drum 20 will be held in position, so as to put the magnetic head 10 into action for play of the forward track of the tap. The tensioning means 50 normally serves to push on the rotary drum 20 in the radial direction, by the action of the leaf spring mounted on the upper housing 31. During the rotation of the rotary drum 20, the steel ball 52 engaged against the sloped side 25A of the recess 25 will be allowed to roll, while remaining engaged therewith, until the tensioning means 50 thrusts its steel ball 52 into the opposite recess 25 against the sloped side 25A thereof. At the point where this engagement of the steel ball with the slope side is achieved in the rotary drum 20, the rotating arm 24 on the rotary drum 20 is put into contact with the tip of the azimuth adjusting screw 40A. If azimuth adjustment is required for the magnetic head positioned for forward track drive, the azimuth adjusting screw 40A shall be rotated to alter the restrictive angular position of the rotary drum 20 that is urged by the action of the helical spring 65, so as to obtain the optimum azimuth angle, or contact angle of the magnetic head 10 relative to the face of the tape (not shown).

In the magnetic head system the tensioning means 50 serves to reduce the undesirable axial movements of the rotary drum 20 when the rotary drum 20 is rotated within the housing 30, by constantly biasing the rotary drum 20 in the radial direction. This is done by the steel ball 52 positioned in the recess 25 formed in the rotary drum in conjunction with the leaf spring 51 to push on the steel ball downwardly. This tension of the leaf spring also serves to firmly retain the rotary drum 20 within the housing 30.

The magnetic head system having the above mentioned arrangement is installed in the tape player with the lower housing 32 rigidly secured to the head slide plate X. The drive means 60 is fixedly mounted on the stationary chassis Y on which the head slide plate is slidably mounted. The rotary drum 20 carrying the magnetic head 10 of generally oval cross-section shape is operatively connected through the toothed rim 23 to the drive means 60 which is actuated to rotate the rotary drum about its axis within the housing 30 to change the direction of travel of the tape.

The transfer of the system to the reverse track is achieved by rotation of the transmission means (not shown) in the opposite direction to that in which the rotary drum is rotated to bring the magnetic head to the forward track position. This rotation of the transmission means causes the drive gear of the drive means 60 to rotate in the same direction or clockwise direction in the drawing, rotating the rotary drum in a counter-clockwise direction through the toothed rim 23, until the rotating arm 24 on the rotary drum 20 comes into abutting engagement with the tail of the azimuth adjusting screw 40B. If azimuth adjustment is required for the magnetic head system positioned for reverse track tape drive, the azimuth adjusting screw 40B shall be turned to alter the restrictive angular position of the rotary drum 20 so as to obtain the optimum azimuth angle, or contact angle of the magnetic head 10 relative to the face of the tape (not shown).

In this embodiment, as the restrictive means to limit rotation of the rotary drum at the restrictive angular position, the recess 25 is formed in such a manner to bias the rotary drum in the radial direction. However, depending on the location of the tensioning means on the outer periphery of the rotary drum, it is possible to produce force that acts in the thrust direction. Further, the tensioning means of this embodiment consists of the combination of one leaf spring and one steel ball. However, according to the requirements involved, pluralities of leaf spring-and-steel ball combinations may be arranged suitably spaced apart from one combination to another along the periphery of the rotary drum. An alternative arrangement may be that a plurality or recesses are formed in the rotary drum for engagement with a single or plural combinations of leaf springs and corresponding steel balls.

Further, the recess formed in the rotary drum is intended, and have been so described, to engage with the tensioning means. However, it can be modified in some way or another to be used as the means to guide the rotation of the gear wheel.

The drive means of this embodiment employs a gear wheel for actuation of the rotary drum. However, with necessary modification, a rack may be used instead of the gear wheel.

FIGS. 19A through 22 present the various views of a still further embodiment of the magnetic head system of this invention. Referring to the drawings, the numeral 20 indicates largely a magnetic head rotary drum of generally oval cross-section configuration which includes flange portions 22 at its both ends and an axially extending bore 21 to enclose therein a magnetic head 10. In this system the magnetic head 10 may be of the type capable of operation both for recording and reproduction. A pinion 73 is axially connected to one of the flange portion and made rigid therewith for rotation of the rotary drum 20. On the same flange portion is affixed a rotating arm 24 which extends largely in the direction parallel to the axis of the rotary drum. The rotary drum 20 is rotatively disposed in a housing 30 which may be composed of two halves; the upper housing 31 and the lower housing 32 both circular in their inner walls. The upper housing 31 has a shoulder portion 35 that projects from one end wall of the upper housing adjacent to which the pinion 73 on the rotary drum 20 is rotated behind the shoulder portion. The shoulder portion 35 is provided with a pin 36 that extends substantially parallel to the axis of the rotary drum. The shoulder portion 35 is also formed with a pair of tapped holes that are drilled parallel to the plane of rotation of the pinion. It is preferable that the flange portions 22 including the pinion 73, the rotary drum, the rotating arm 24, the upper housing 31, and the lower housing 32 are of an integral construction of nonmagnetic material such as synthetic resins and zinc alloys. The provision of the paired tapped holes in the shoulder portion 35 of the upper housing 31 is to receive therethrough a pair of azimuth adjusting screws 40A and 40B, respectively, which are rotatably positioned with the interposition of springs 41 and 42 to abut against with their respective lower tips the rotating arm 24. Each of these azimuth adjusting screws can be turned in either direction to allow its tail to abut against the rotating arm on the rotary drum at any desired depth. Thus, the angular positions of the rotary drum 20 relative to the housing that are determined by the azimuth adjusting screws are the positions of the magnetic head to play the forward, or the reverse, respectively, of the tape. The numeral 61' generally indicates a drive gear which may, as can best be seen in FIGS. 20 and 21, be a section of an internal spur gear having an internally geared periphery 61", a projection 63", and a center bore 62' to receive the pin 36 that is rigidly affixed on the upper housing 31. The drive gear is disposed to rotate about the pin 36 and has its geared periphery engaged with the pinion 73 to rotate the rotary drum. Preferably, the drive gear 61' is made of the same material as the housing 30, such as synthetic resins and zinc alloys. A wire system, generally designated by the numeral 70, comprises a wire 74, a pair of restrictive rings 75A and 75B which are secured on one end of the wire 74 in a spaced relation to each other, and a tubular cover 76 to enclose therein the major portion of the wire 74. This wire system may be a release or any other similar means devised to meet the purposes to be described hereinafter, and, in order to operate the drive means, is connected to a suitable wire actuating means in a manner also to be described later. The wire is extended between such an actuating means and the drive gear 61' for rotation of the latter. In this embodiment, the wire 74 is secured around the projection 63" on the drive gear. One end of the tubular cover 76 is secured to suitable stationary member (not shown) in the chassis. The other end of the tubular cover is secured to the housing 30. With this arrangement, the back and forth movement of the wire 74 is converted into rotary motion of the drive gear 61'. As the wire actuating means to actuate the wire system, a drive means, comprises a frame 71 having two opposite vertical walls. The frame is slidably disposed on a suitable stantionary member in the chassis and, as can clearly be seen in FIG. 22, has its one vertical wall bored to permit the wire 74 to enter therethrough between the vertical walls. The one restrictive ring 75B is attached to the wire in the frame 71, whereas the other restrictive ring 75A carried on the wire outside the frame. A spring 72 is mounted around the wire between the vertical walls of the frame in such a manner to bias the restrictive rings in opposite directions. For actuation of the wire system 70, the drive means is connected to a slider means, not shown, which is connected to slide the frame 71 back and forth over a predetermined length of stroke A between a first and a second position; the first position depicted by solid line, the second by broken line in FIGS. 19A and 19B. This sliding movement of the frame is transmitted to the wire 74 through the spring 72 so as to move the wire of the wire system 70 in synchronism.

In this particular embodiment, the wire system 70 is actuated by a sliding means, as have been mentioned above, which is adapted to slide the wire 74 back and forth. However, as an alternative measure, the wire system may be operated by a windlass-like drive means having a rotary member which can while winding up or unwinding the wire 74, move it back and forth. This drive means must itself be actuated in some separate manner. There are a variety of means possibly applicable to operate such a drive means.

Figure 19B:
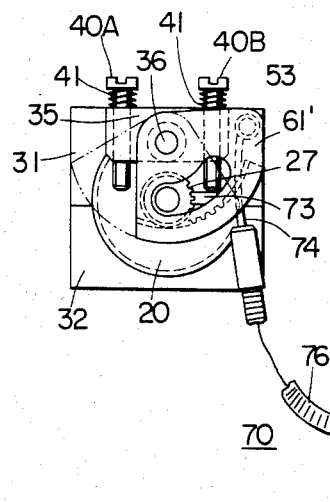
FIGS. 19A and 19B are plan and side views of a still further embodiment of the present invention.
Figure 19A:
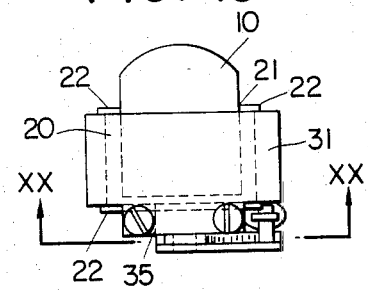
Figure 20:
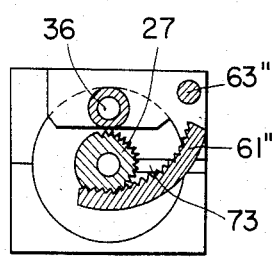
FIG. 20 is a cross sectional view taken along the line XX of FIG. 19A.
Figure 21:
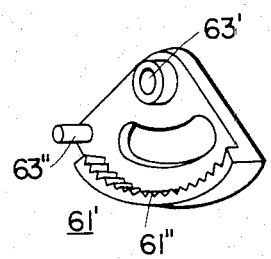
FIG. 21 is a perspective view of the drive gear used in the above embodiment.
Figure 18:
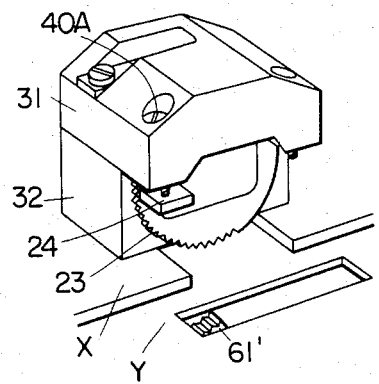
FIG. 18 is a perspective view of the housing and rotary drum in assembly.
Figure 22:
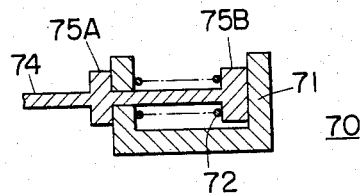
FIG. 22 is a partially enlarged view of the wire system of the embodiment of FIGS. 19A to 19B.

Referring first to FIGS. 19A and 19B for the magnetic head to play the forward track of the tape, assuming that adjusting screw 40A determines the restrictive angular position of the rotary drum to set the magnetic head to play the forward track, the slider, not shown in the drawing, must move the frame of the wire drive means in the righthand direction to the position depicted by broken line in the drawing, over the entire distance of stroke A. This sliding movement of the frame will cause the wire 74 of the wire system 70 to move backwards by way of the spring 72, rotating the drive gear 61' in a counter-clockwise direction about the pin 36. Since the drive gear 61' is engaged with the pinion 27 of the rotary drum 20, this rotary motion of the drive gear 61' is transmitted through the pinion 73 to the rotary drum 20 which in turn will be rotated in a counter-clockwise direction until the rotating arm 24 comes into contact with the tip of the corresponding azimuth adjusting screw. In this manner, the magnetic head in the rotary drum 20 is rotated and held in position to play the forward track. If azimuth adjustment is required for the magnetic head 10 positioned for forward drive of the tape, the azimuth adjusting screw 40A shall be turned to alter the angular position of the rotary drum 20 to obtain the optimum azimuth angle, or contact angle of the magnetic head 10 relative to the face of the tape.

Then, or the magnetic head system to shift to the position for playing the reverse track, the slider must be slided in the opposite direction to that in which it is slided for forward tape travel, or left-hand position in the drawing, to rotate the pinion 73 that is engaged with the drive gear 61' in the opposite direction to that in which it is rotated to shift to the forward track position. This rotation of the pinion brings the rotating arm 24 on the rotary drum 20 to abut against the tip of the azimuth adjusting screw 40B so as to position the magnetic head for play of the reverse track. Similarly, if azimuth adjustment is necessary for the magnetic head 10 at this position, the azimuth adjusting screw 40B shall be turned to later the angular position of the rotary drum 20 so as to obtain the azimuth angle, or contact angle of the magnetic head 10 relative to the face of tape (not shown).

The magnetic head system having the above mentioned arrangement is installed in the tape player with its lower housing 32 rigidly secured on a conventional head slide plate (not shown), whereas the wire actuating means (not shown) for the wire system 70 on a stationary chassis (not shown) on which the head slide plate is slidably disposed. It is so arranged that the pinion 73 which is in mesh with the drive gear 50 rotates the rotary drum 20 of carrying the magnetic head 10 about its axis within the housing 30.

To summarize, the present invention provides a unique magnetic head system comprising a magnetic head carrying rotary drum which encloses fittingly a magnetic head within its axially extending, generally oval cross-section bore and which is rotatively placed within a housing which has a roller means interposed betwen the outer periphery of the rotary drum and the inner circular wall of the housing to provide for smooth rotation of the rotary drum within the housing. A gear wheel is axially connected to the rotary drum and is driven by a drive means which may be connected in mesh engagement to the gear wheel to rotate in conjunction with the roller means the rotary drum so as to bring the magnetic head to change tracks of the tape. A rotating arm is secured to the rotary drum for rotation therewith and designed to cooperate with the housing to prevent the rotary arm from rotation beyond restricted rotational points at which the magnetic head is put into action to play the forward and the reverse tracks, respectively, of the tape. It will be easily seen that the magnetic head system having the above mentioned arrangement is relatively compact, so that the distance from the magnetic head to the gear wheel adapted for directly rotating the head can be reduced. Further, the system has the advantage of being able to rotate the rotary drum with relatively small torque when shifting tracks of the tape.

What is claimed is:

1. A magnetic head system for a tape player capable of changing tracks in association of the magnetic tape by rotating the magnetic head comprising
    a substantially cylindrical rotary member having a bore axially extending to enclose a magnetic head therein and having an arm attached thereto, said rotary member further having gear means therearound;
    a housing to hold said rotary member closely fit therewithin for axial rotation;
    drive means in mesh with said gear means of said rotary member; said rotary member being adapted to be rotated by the driving means by substantially 180 degrees about an axis thereof whereas said housing is adapted to control the rotation of the rotary member by way of said arm.

2. A magnetic head system according to claim 1, further including means for ensuring close fit between the rotary member and the housing.

3. A magnetic head system according to claim 2, wherein said close fit ensuring means includes ball means.

4. A magnetic head system according to claim 3, wherein said close fit ensuring means includes resilient means.

5. A magnetic head system according to claim 1, further including means for urging said rotary member against the housing.

6. A magnetic head system accoridng to claim 5, wherein said urging means is provided on the driving means.

* * * * *